US00H002159H

(19) United States
(12) Statutory Invention Registration
McGoldrick

(10) Reg. No.: US H2159 H
(43) Published: Jul. 4, 2006

(54) GUIDANCE OF TREATMENT DEVICES ON TARGET SURFACES

(75) Inventor: Daniel B. McGoldrick, Alexandria, VA (US)

(73) Assignee: The United States of America as represented by the Secretary of the Navy, Washington, DC (US)

(21) Appl. No.: 10/758,558

(22) Filed: Jan. 16, 2004

(51) Int. Cl.
*B05B 13/02* (2006.01)

(52) U.S. Cl. ..... 118/305; 118/306; 114/222
(58) Field of Classification Search ..... 118/305, 118/306; 114/222
See application file for complete search history.

(56) References Cited

U.S. PATENT DOCUMENTS

| | | | | |
|---|---|---|---|---|
| 2,543,348 A | * | 2/1951 | Briese | 114/222 |
| 3,863,393 A | * | 2/1975 | Goff | 451/92 |
| 4,048,956 A | * | 9/1977 | Estebanez et al. | 118/306 |
| 5,033,710 A | | 7/1991 | Antoniadis | |
| 6,285,339 B1 | | 9/2001 | McGill | |
| 6,431,387 B1 | | 8/2002 | Piehler | |
| 6,510,795 B1 | | 1/2003 | Detmers et al. | |

OTHER PUBLICATIONS

Miyazaki, Tatsuo et al., Article titled: "NC Painting Robot For Shipbuilding", pp. 1–14.
The Maersk Mc–Kinney Moller Institute for Production-Technology, University of Southern Denmark, Smart Painter, pp. 1–4.
IRB 8400 Gantry Robot for load transfer from 25 to 2500kg, pp. 1–3.
ABB i Norge IRB 5600 p. 1.
ABB i Norge Paint robots p. 1.

* cited by examiner

*Primary Examiner*—M. Clement
(74) *Attorney, Agent, or Firm*—Jacob Shuster

(57) ABSTRACT

A pair of vertical guide supports are slidably received in horizontally spaced rails removably mounted on a vertical target surface to be treated, such as the hull of a ship. A rack support interconnects the vertical guide supports and is vertically displaceable relative thereto with a rack plate thereby positioned in spaced relation to the target surface. A treatment device such as a pressurized paint ejector is positioned on the rack plate for selectively imposed movement therewith along linear paths to positions at which it is aligned perpendicular to the target surface to be completely treated by application or removal of paint for example.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GUIDANCE OF TREATMENT DEVICES ON TARGET SURFACES

STATEMENT OF GOVERNMENT INTEREST

The invention described herein may be manufactured and used by or for the Government of the United States of America for governmental purposes without the payment of any royalties thereon or therefore.

The present invention relates to guided positioning of a surface treatment device in spaced relation to a target surface, such as the hull of a ship.

BACKGROUND OF THE INVENTION

Ship hulls and other large surfaces are traditionally painted manually using power spray guns and involving for example scaffolding and over-spray protection during a relatively inefficient coating process. Such surfaces are also treated for removal of paint therefrom, involving discharges of grit or water under high pressures from de-paint devices attached to manipulating facilities requiring use of additional labor and materials. Patent protection was heretofore provided for surface attachable guidance apparatus and method for different devices, to the exclusion of coating of vertical surfaces such as ship hulls with paint. It is therefore an important object of the present invention to provide for efficient transfer of coatings such as paint to and from surfaces such as ship hulls.

SUMMARY OF THE INVENTION

In accordance with the present invention rail track guidance facilities are attachable to a target surface, such as a ship hull, on which it is exclusively supported to thereby establish horizontal and vertical guide paths in spaced relation to the target surface along which a guide support for a surface treatment device is displaced to plural locations at which the treatment device is positioned preferably along an ejection axis aligned perpendicular to the target surface so as to perform paint coating or de-coating operations with maximized efficiency.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF THE PREFERRED EMBODIMENT

Figure 1:
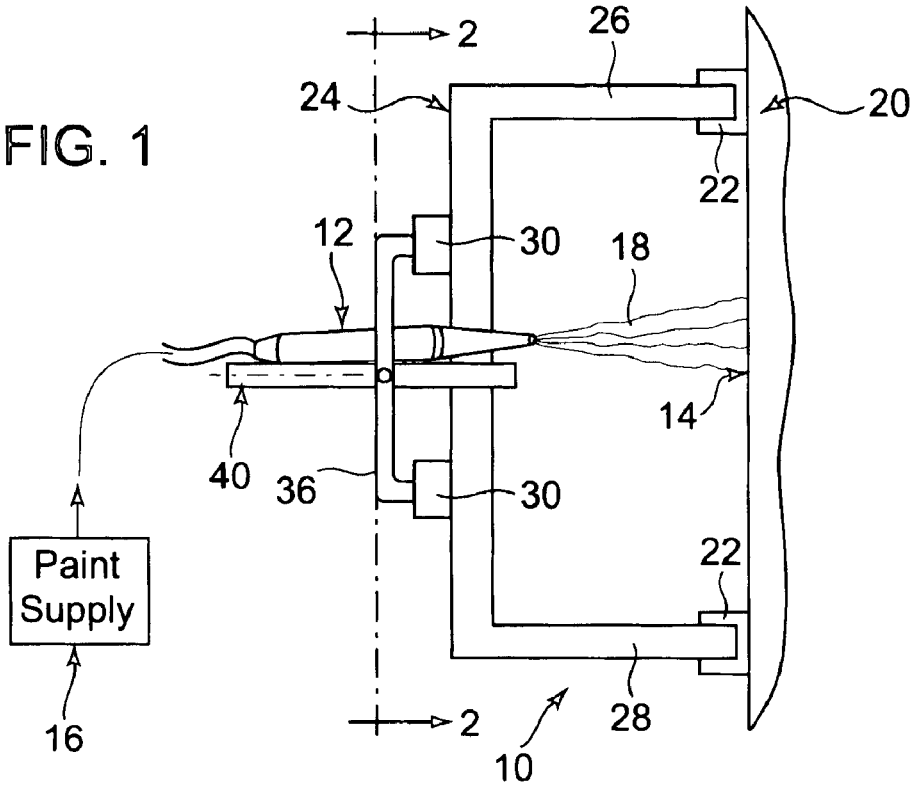
FIG. 1 is a side elevation view of a guidance support apparatus for treatment of a target surface to which the apparatus is attached.
Figure 2:
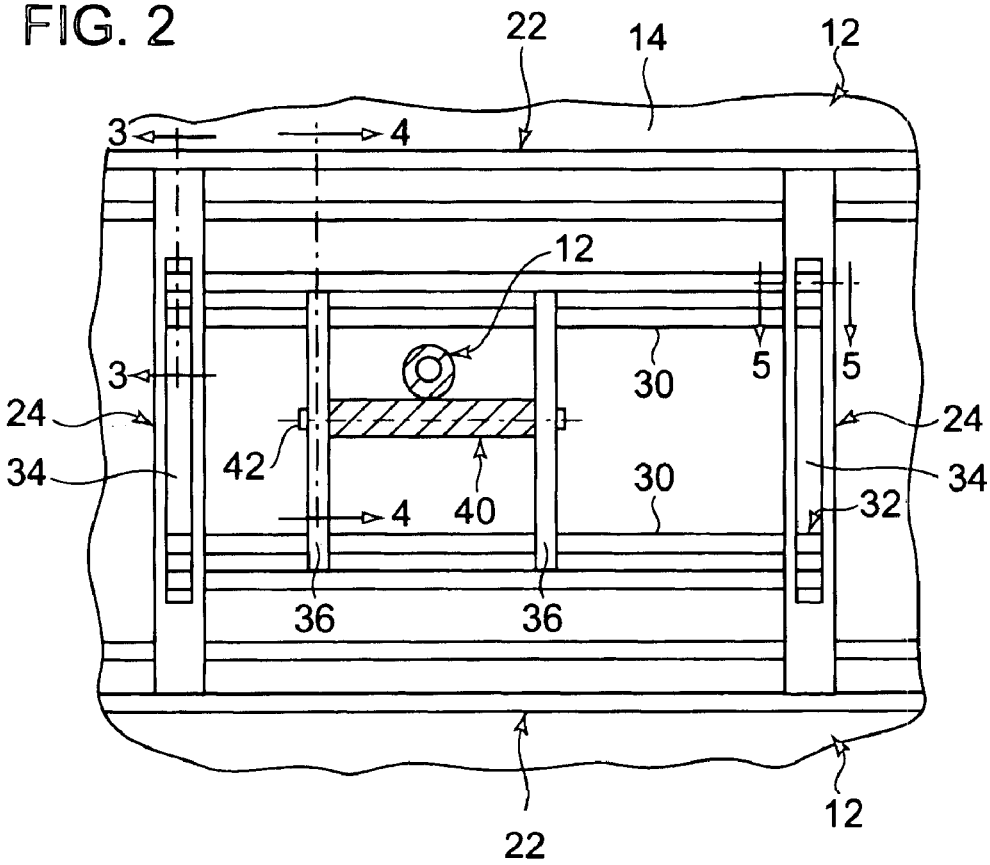
FIG. 2 is a front view of the apparatus shown in FIG. 1 as viewed from section line 2—2.
Figure 3:
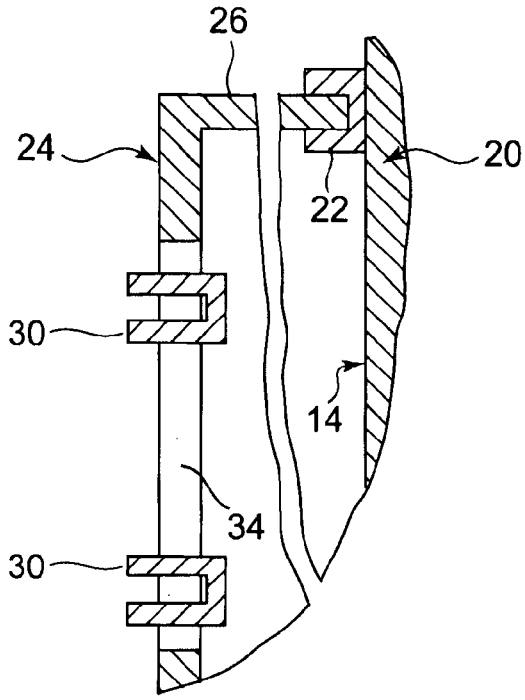
FIGS. 3, 4 and 5 are partial sections taken substantially through planes 3—3, 4—4 and 5—5 in FIG. 2.
Figure 5:
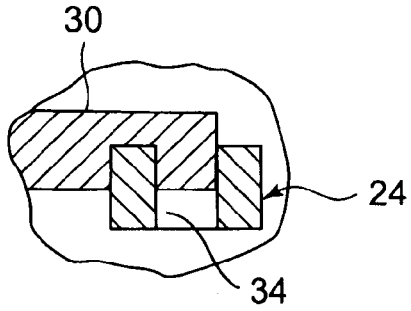

Referring now to the drawing in detail, FIG. 1 illustrates a guidance assembly, generally referred to by reference numeral 10, through which movement of a surface treatment device 12 is selectively controlled in spaced relation to a vertical target surface 14 to which the guidance assembly 10 is removably attached at different locations. As shown in FIG. 1, the surface treatment device 12 is in the form of a pressurized paint spray ejection nozzle connected to a paint supply 16. A spray 18 of liquid paint is accordingly shown ejected from the ejection nozzle type treatment device 12 so as to paint the target surface 14, which may be on the exterior of a ship hull 20 on which a pair of fixed guide rails 22 of the guidance assembly 10 are attached in parallel spaced relation to each other so as to exclusively support the guidance assembly 10. A pair of vertical rail guide supports 24 are associated with the guidance assembly 10 as shown in FIGS. 1 and 2. Upper and lower arms 26 and 28 extending from the vertical supports 24 are slidably received in the guide rails 22 for guided displacement of the supports 24 relative to the vertical target surface 14 in a horizontal direction. As shown in FIGS. 2 and 5, the vertical guide supports 24 are interconnected and held in horizontally spaced relation to each other by a pair of horizontal support rails 30 having end sections 32 slidably received within vertical guide slots 34 formed in the guide supports 24.

Figure 4:
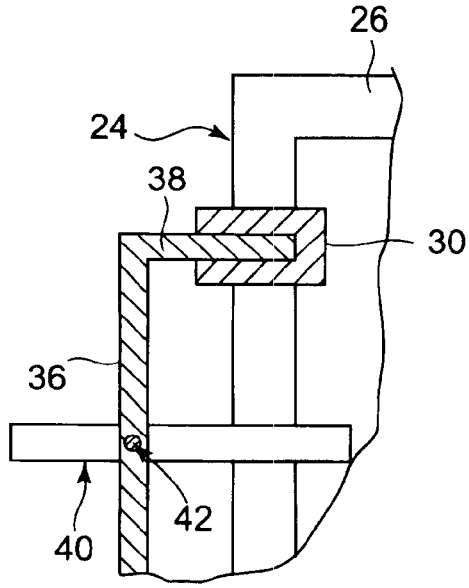

It will be apparent from the foregoing description that the treatment ejection device 12 positioned on the rack plate 40 at each of a plurality of locations along the support rails 30 and guide slots 34 in perpendicular alignment with the target surface 14 as shown in FIGS. 1 and 4 so as to apply the spray 18 to the surface 14 between the supports 24 and the upper and lower surface guide rails 22 with maximized surface treatment. A portion of the surface 14 between the horizontal rails 22 and the vertical supports 24 may thereby be efficiently and completely treated. The vertical supports 24 may be shifted horizontally along linear paths on the surface 14 along the rails 22 to sequentially cover other portions of the surface 14 during a treatment process. The horizontal guide rails 22 removably attached to the surface 14 may be furthermore shifted to other locations on the surface 14 for treatment purposes to thereby cover the entire surface 14 to be treated.

Obviously, other modifications and variations of the present invention may be possible in light of the foregoing teachings. It is therefore to be understood that within the scope of the appended claims the invention may be practiced otherwise than as specifically described.

What is claimed is:

1. Apparatus for treatment of a target surface by coating thereof applied from an ejection device, comprising: guidance means exclusively supported on the target surface for establishing linear paths of movement in spaced relation thereto; support means on which the ejection device is positioned for ejection of the coating therefrom; and selectively controlled mounting means for positioning of the support means at different locations along said linear paths of movement on the guidance means from which said ejection of the coating onto the target surface is effected from the ejection device to perform said treatment of the target surface.

2. The apparatus as defined in claim 1, wherein said target surface is a ship hull and said ejection device is a liquid paint applicator from which paint as the coating is applied to the target surface.

3. The apparatus as defined in claim 2, wherein said guidance means includes: horizontal track rails on the target surface; and vertical guide means slidably received in the track rails for displacement of the support means along said linear paths of movement to the different locations.

4. The apparatus as defined in claim 3, wherein said support means includes: a support rack mounted by the vertical guide means in perpendicular relation to the target surface.

5. The apparatus as defined in claim 1, wherein said treatment of the target surface involves de-coating thereof by removal of the paint therefrom.

6. A method for treatment of a target surface under selective control of an ejection device, including the steps of: establishing linear guide paths along which movement of the ejection device is guided to positions in spaced relation to the target surface; and imparting vertical and horizontal movement to the ejection device in each of said positions from which said treatment is applied to the target surface.

7. The method as defined in claim 6, wherein said treatment involves application of a uniform coating of paint to the target surface by efficient transfer from the ejection device.

8. The method as defined in claim 6, wherein said treatment of the target surface involves removal of paint therefrom.

* * * * *